US012571891B2

(12) United States Patent
Perin et al.

(10) Patent No.: US 12,571,891 B2
(45) Date of Patent: Mar. 10, 2026

(54) TECHNIQUES FOR PEAK DETECTION IN A LIDAR SYSTEM USING WEIGHTED METRICS AND BAND SELECTION

(71) Applicant: Aeva, Inc., Mountain View, CA (US)

(72) Inventors: Jose Krause Perin, Mountain View, CA (US); Esha John, Sunnyvale, CA (US); Kumar Bhargav Viswanatha, Santa Clara, CA (US); Mina Rezk, Haymarket, VA (US); Rajendra Tushar Moorti, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 969 days.

(21) Appl. No.: 17/745,312

(22) Filed: May 16, 2022

(65) Prior Publication Data

US 2022/0397669 A1 Dec. 15, 2022

Related U.S. Application Data

(60) Provisional application No. 63/209,774, filed on Jun. 11, 2021.

(51) Int. Cl.
*G01S 7/4912* (2020.01)
*G01S 7/491* (2020.01)
(Continued)

(52) U.S. Cl.
CPC ............ *G01S 7/4912* (2013.01); *G01S 7/491* (2013.01); *G01S 7/497* (2013.01); *G01S 17/34* (2020.01); *G01S 17/66* (2013.01); *G01S 17/931* (2020.01)

(58) Field of Classification Search
None
See application file for complete search history.

(56) References Cited

U.S. PATENT DOCUMENTS

| 8,947,644 B2 | 2/2015 | Halmos |
| 11,047,953 B1 | 6/2021 | Sankar |

(Continued)

OTHER PUBLICATIONS

Non-Final Office Action Correspondence of U.S. Appl. No. 17/745,420 mailed Jun. 11, 2025, 12 pages.
(Continued)

*Primary Examiner* — Luke D Ratcliffe
(74) *Attorney, Agent, or Firm* — Womble Bond Dickinson (US) LLP

(57) ABSTRACT

A light detection and ranging (LIDAR) system performs a method including generating a frequency domain waveform based on a baseband electrical signal in a time domain, wherein the frequency domain waveform includes a spectrum of frequencies and determining a likelihood metric for the spectrum of frequencies of the frequency domain waveform. The method further includes in response to one or more parameters associated with the frequency domain waveform satisfying a condition, modifying the likelihood metric for the spectrum of frequencies based on the one or more parameters associated with the frequency domain waveform to generate a modified likelihood metric for the spectrum of frequencies, selecting a peak frequency from the frequency domain waveform corresponding to a frequency with the highest value for the modified likelihood metric, and determining one or more properties of a target based at least in part on the selected peak frequency.

21 Claims, 12 Drawing Sheets

(51) Int. Cl.

| | |
|---|---|
| *G01S 7/497* | (2006.01) |
| *G01S 17/34* | (2020.01) |
| *G01S 17/66* | (2006.01) |
| *G01S 17/931* | (2020.01) |

(56) References Cited

U.S. PATENT DOCUMENTS

| | | |
|---|---|---|
| 12,189,038 B2 | 1/2025 | Pacala |
| 2017/0329013 A1 | 11/2017 | Halmos |
| 2019/0179018 A1 | 6/2019 | Gunnam |
| 2019/0317191 A1 | 10/2019 | Santra |
| 2020/0018854 A1 | 1/2020 | Hicks et al. |
| 2020/0200904 A1 | 6/2020 | Singer et al. |
| 2021/0293960 A1* | 9/2021 | Kreitinger ............ G01S 7/4815 |
| 2021/0325519 A1 | 10/2021 | Shi |

OTHER PUBLICATIONS

Non-Final Office Action Correspondence of U.S. Appl. No. 17/745,244 mailed Apr. 18, 2024, 13 pages.

\* cited by examiner

700

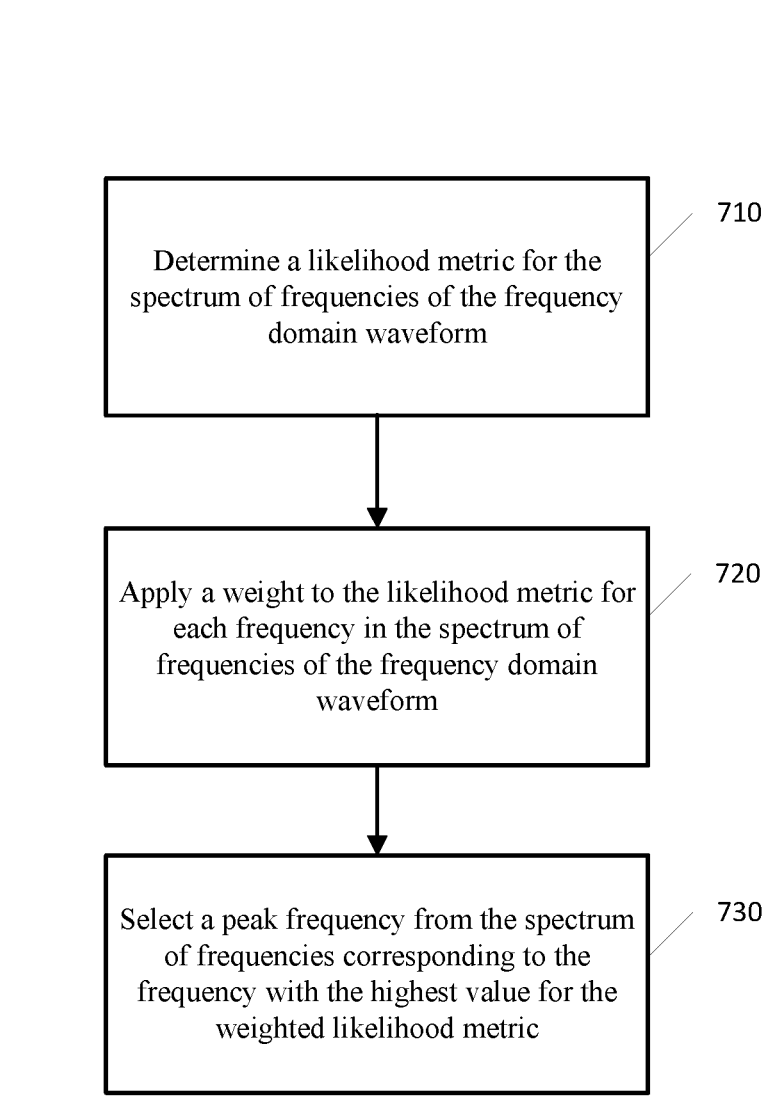

710
Determine a likelihood metric for the spectrum of frequencies of the frequency domain waveform 720
Apply a weight to the likelihood metric for each frequency in the spectrum of frequencies of the frequency domain waveform 730
Select a peak frequency from the spectrum of frequencies corresponding to the frequency with the highest value for the weighted likelihood metric

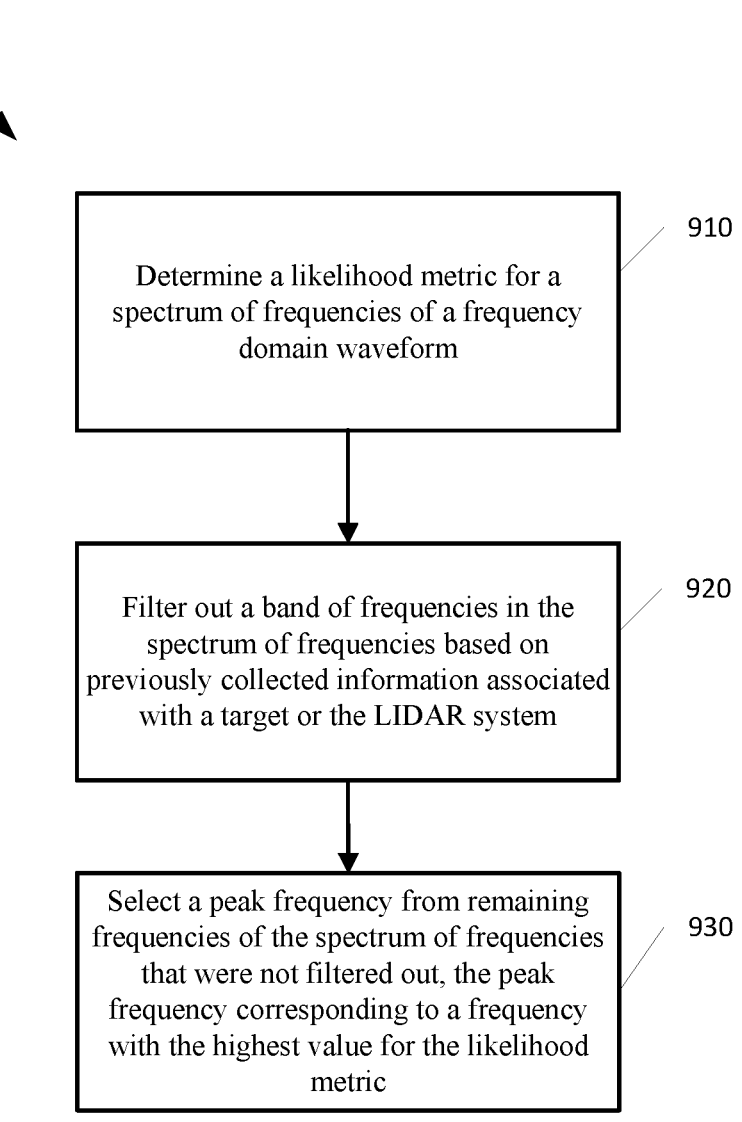

Determine a likelihood metric for a spectrum of frequencies of a frequency domain waveform

910

Filter out a band of frequencies in the spectrum of frequencies based on previously collected information associated with a target or the LIDAR system

920

Select a peak frequency from remaining frequencies of the spectrum of frequencies that were not filtered out, the peak frequency corresponding to a frequency with the highest value for the likelihood metric

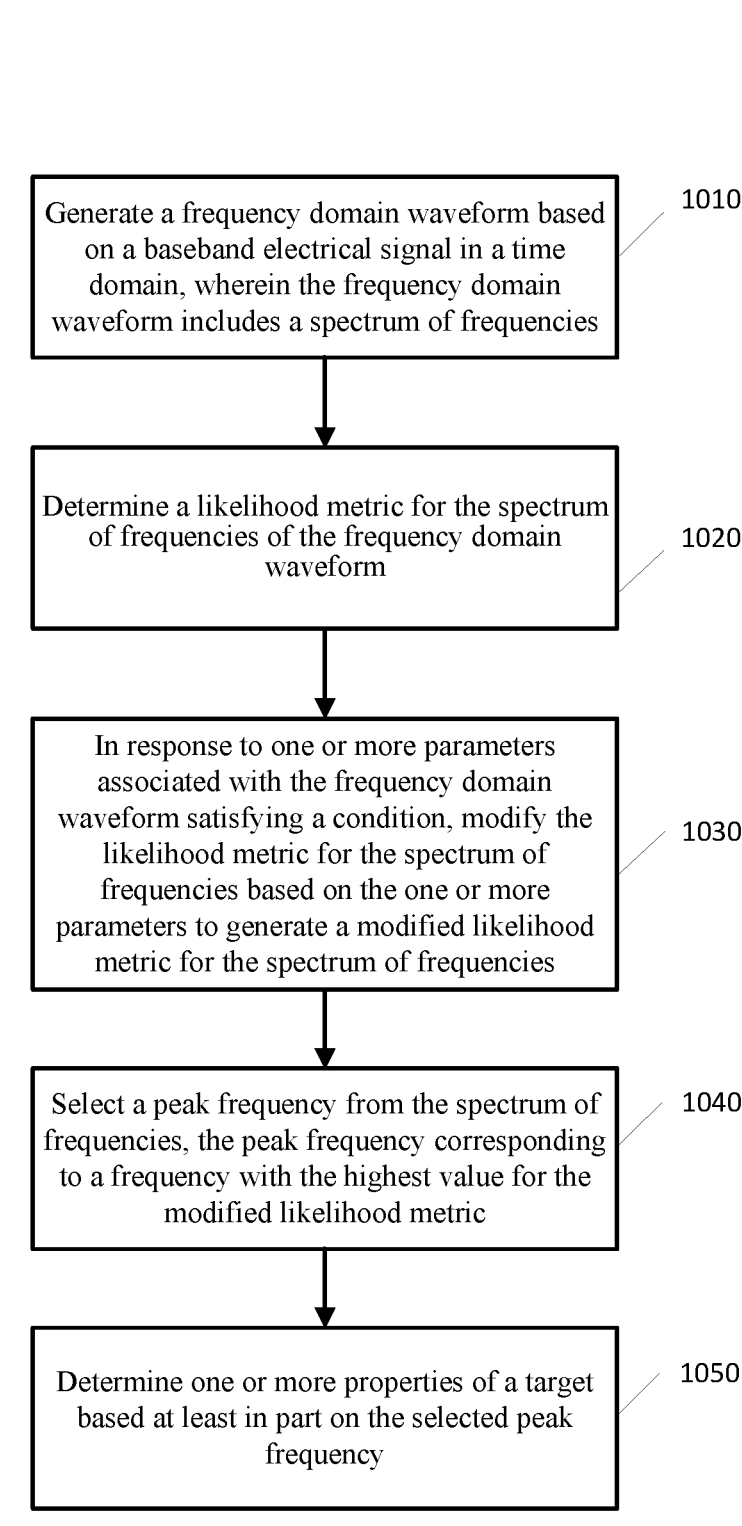

Generate a frequency domain waveform based on a baseband electrical signal in a time domain, wherein the frequency domain waveform includes a spectrum of frequencies — 1010

Determine a likelihood metric for the spectrum of frequencies of the frequency domain waveform — 1020

In response to one or more parameters associated with the frequency domain waveform satisfying a condition, modify the likelihood metric for the spectrum of frequencies based on the one or more parameters to generate a modified likelihood metric for the spectrum of frequencies — 1030

Select a peak frequency from the spectrum of frequencies, the peak frequency corresponding to a frequency with the highest value for the modified likelihood metric — 1040

Determine one or more properties of a target based at least in part on the selected peak frequency — 1050

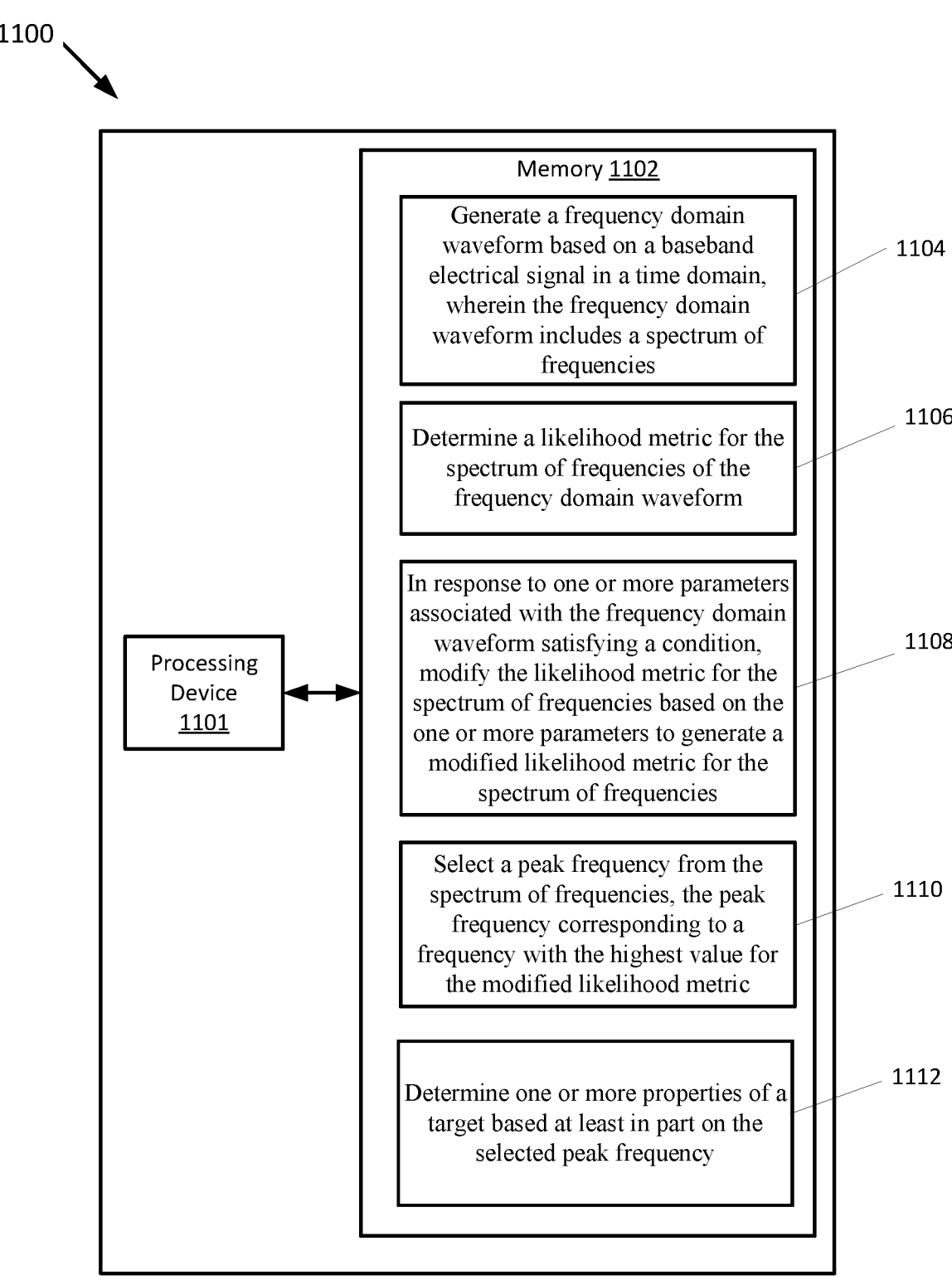

Memory 1102

Generate a frequency domain waveform based on a baseband electrical signal in a time domain, wherein the frequency domain waveform includes a spectrum of frequencies    1104

Determine a likelihood metric for the spectrum of frequencies of the frequency domain waveform    1106

In response to one or more parameters associated with the frequency domain waveform satisfying a condition, modify the likelihood metric for the spectrum of frequencies based on the one or more parameters to generate a modified likelihood metric for the spectrum of frequencies    1108

Select a peak frequency from the spectrum of frequencies, the peak frequency corresponding to a frequency with the highest value for the modified likelihood metric    1110

Determine one or more properties of a target based at least in part on the selected peak frequency    1112

Processing Device 1101

FIG. 11

TECHNIQUES FOR PEAK DETECTION IN A LIDAR SYSTEM USING WEIGHTED METRICS AND BAND SELECTION

RELATED APPLICATIONS

This application claims priority from and the benefit of U.S. Provisional Patent Application No. 63/209,774 filed on Jun. 11, 2021, the entire contents of which are incorporated herein by reference in their entirety.

FIELD

The present disclosure is related to light detection and ranging (LIDAR) systems in general, and more particularly to peak detection in frequency-modulated continuous-wave (FMCW) LIDAR systems.

BACKGROUND

Frequency-Modulated Continuous-Wave (FMCW) LIDAR systems use tunable, infrared lasers for frequency-chirped illumination of targets, and coherent receivers for detection of backscattered or reflected light from the targets that are combined with a local copy of the transmitted signal. Mixing the local copy with the return signal, delayed by the round-trip time to the target and back, generates signals at the receiver with frequencies that are proportional to the distance to each target in the field of view of the system. Human safety considerations mandate the use of low-power lasers so that reflections from objects have very low signal strength. The range and accuracy of a LIDAR system is a function of signal-to-noise ratio, yet conventional solutions fail to reliably detect targets with a weak return signal while also limiting false target detections.

SUMMARY

The present disclosure describes examples of systems and methods for peak detection in FMCW LIDAR.

A light detection and ranging (LIDAR) system includes an optical scanner to transmit an optical beam towards, and receive a return signal from, a target, an optical processing system coupled to the optical scanner to generate a baseband electrical signal in a time domain from the return signal, the baseband electrical signal comprising frequencies corresponding to LIDAR target ranges, and a signal processing system coupled to the optical processing system. The signal processing system includes a processor and a memory operatively coupled to the processor, the memory to store instructions that, when executed by the processor, cause the LIDAR system to generate a frequency domain waveform based on the baseband electrical signal in the time domain, wherein the frequency domain waveform comprises a spectrum of frequencies and determine a likelihood metric for the spectrum of frequencies of the frequency domain waveform. The instructions to further cause the LIDAR system to, in response to one or parameters associated with the frequency domain waveform satisfying a condition, modify the likelihood metric for the spectrum of frequencies based on the one or more parameters to generate a modified likelihood metric for the spectrum of frequencies, select a peak frequency from the spectrum of frequencies corresponding to a frequency with the highest value for the modified likelihood metric, and determine one or more properties of a target based at least in part on the selected peak frequency.

In one embodiment, to modify the likelihood metric the processor is to apply a weight to the likelihood metric for each of the frequencies of the spectrum of frequencies to generate a weighted likelihood metric for the spectrum of frequencies of the frequency domain waveform. In some embodiments, the processor is further to select a peak frequency from the spectrum of frequencies corresponding to the frequency with the highest value for the weighted likelihood metric. In some embodiments, the processor is to determine the weight applied to the likelihood metric based on at least one of frequency, peak width, or a correlation metric. In some embodiments, the processor is to determine the weight applied to the likelihood metric based on whether a scene scanned by the LIDAR system is static or dynamic.

In one embodiment, to modify the likelihood metric the processor is to filter out a portion of the frequencies in the spectrum of frequencies based on previously collected information associated with the target or the LIDAR system. In one embodiment, the portion of the frequencies comprises one or more bands of frequencies in the spectrum of frequencies of the frequency domain waveform. In one embodiment, the at least one of the one or more bands of frequencies corresponds to an interferer to be filtered out from the frequency domain waveform prior to peak selection. In one embodiment, the band of frequencies corresponds to a previously selected peak.

In some embodiments, a method includes generating a frequency domain waveform based on a baseband electrical signal in a time domain, wherein the frequency domain waveform comprises a spectrum of frequencies, determining a likelihood metric for the spectrum of frequencies of the frequency domain waveform, and in response to one or more parameters associated with the frequency domain waveform satisfying a condition, modifying the likelihood metric for the spectrum of frequencies based on the one or more parameters associated with the frequency domain waveform to generate a modified likelihood metric for the spectrum of frequencies. The method further includes selecting a peak frequency from the frequency domain waveform corresponding to a frequency with the highest value for the modified likelihood metric and determining one or more properties of a target based at least in part on the selected peak frequency.

In some embodiments, a light detection and ranging (LIDAR) system includes an optical scanner to transmit an optical beam towards a target and receive a return signal from the target, an optical processing system coupled to the optical scanner to generate a baseband electrical signal in a time domain from the return signal, the baseband electrical signal comprising frequencies corresponding to LIDAR target ranges, and a signal processing system coupled to the optical processing system. The signal processing system includes circuitry and a memory operatively coupled to the circuitry, the memory to store instructions that, when executed by the circuitry, cause the LIDAR system to generate a frequency domain waveform based on the baseband electrical signal in the time domain, wherein the frequency domain waveform comprises an intensity for a spectrum of frequencies and determine a likelihood metric for each of the frequencies in the spectrum of frequencies based on the frequency domain waveform. The instructions further cause the LIDAR system to, in response to one or more properties of the LIDAR system, the target, or the frequency domain waveform satisfying a condition, generate a modified likelihood metric for each of the frequencies in the spectrum of frequencies based on the one or more properties of the LIDAR system, the target, or the frequency domain waveform, select a peak frequency from the spectrum of frequencies corresponding to the frequency with the highest value for the modified likelihood metric, and determine at least a range of the target based at least in part on the selected peak frequency.

BRIEF DESCRIPTION OF THE DRAWINGS

For a more complete understanding of various examples, reference is now made to the following detailed description taken in connection with the accompanying drawings in which like identifiers correspond to like elements:

FIG. 7 is a flowchart illustrating a method of peak detection using a weighted likelihood metric, according to the present disclosure;

FIG. 9 is a flowchart illustrating a method of peak detection by filtering out frequency bands prior to peak selection, according to the present disclosure;

FIG. 10 is a flowchart illustrating a method of peak detection according to the present disclosure; and FIG. 11 is a block diagram of an example signal processing system according to the present disclosure.

DETAILED DESCRIPTION

The present disclosure describes various examples of LIDAR systems and methods for using weighted likelihood metrics and band selection for peak detection in a LIDAR system to improve target detection and reduce false detections. According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency modulated continuous-wave (FMCW) device that assists with spatial awareness for automated driver assist systems, or self-driving vehicles.

Lidar systems described by the embodiments herein include coherent scan technology to detect a signal returned from a target to generate a coherent heterodyne signal, from which range and velocity information of the target may be extracted. The signal may be converted into one or more frequency bins, each with a magnitude of the associated frequencies within the bin. In some scenarios, a target detection may correspond to a large magnitude (i.e., a peak) for one or more frequency bins. However, selecting a peak that properly corresponds to an actual target detection may be difficult due to internal and external noise sources and other interferences that may occur. Using the techniques described herein, embodiments of the present invention can, among other things, address the issues described above by generating and modifying (e.g., weighting and filtering) one or more likelihood metrics for the frequency spectrum detected by the LIDAR to perform peak detection. Accordingly, the probability of detecting a target is increased while the probability of false detections is increased by generating and modifying the one or more likelihood metrics for a frequency spectrum to favor peak selection corresponding to target detections.

Figure 1:
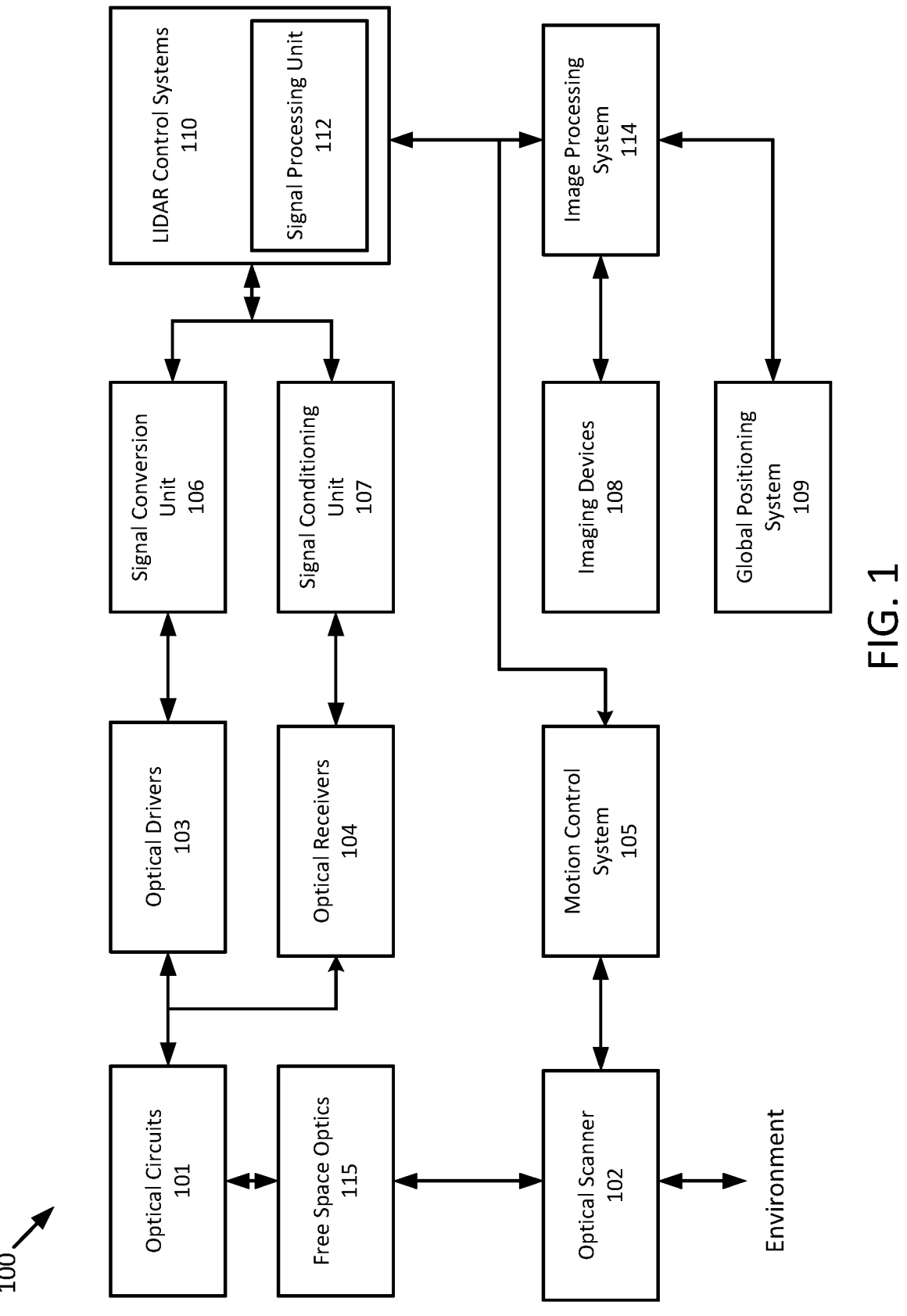
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produce a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data that includes information about range and/or velocity points in the target environment as the optical scanner 102 scans additional points. The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
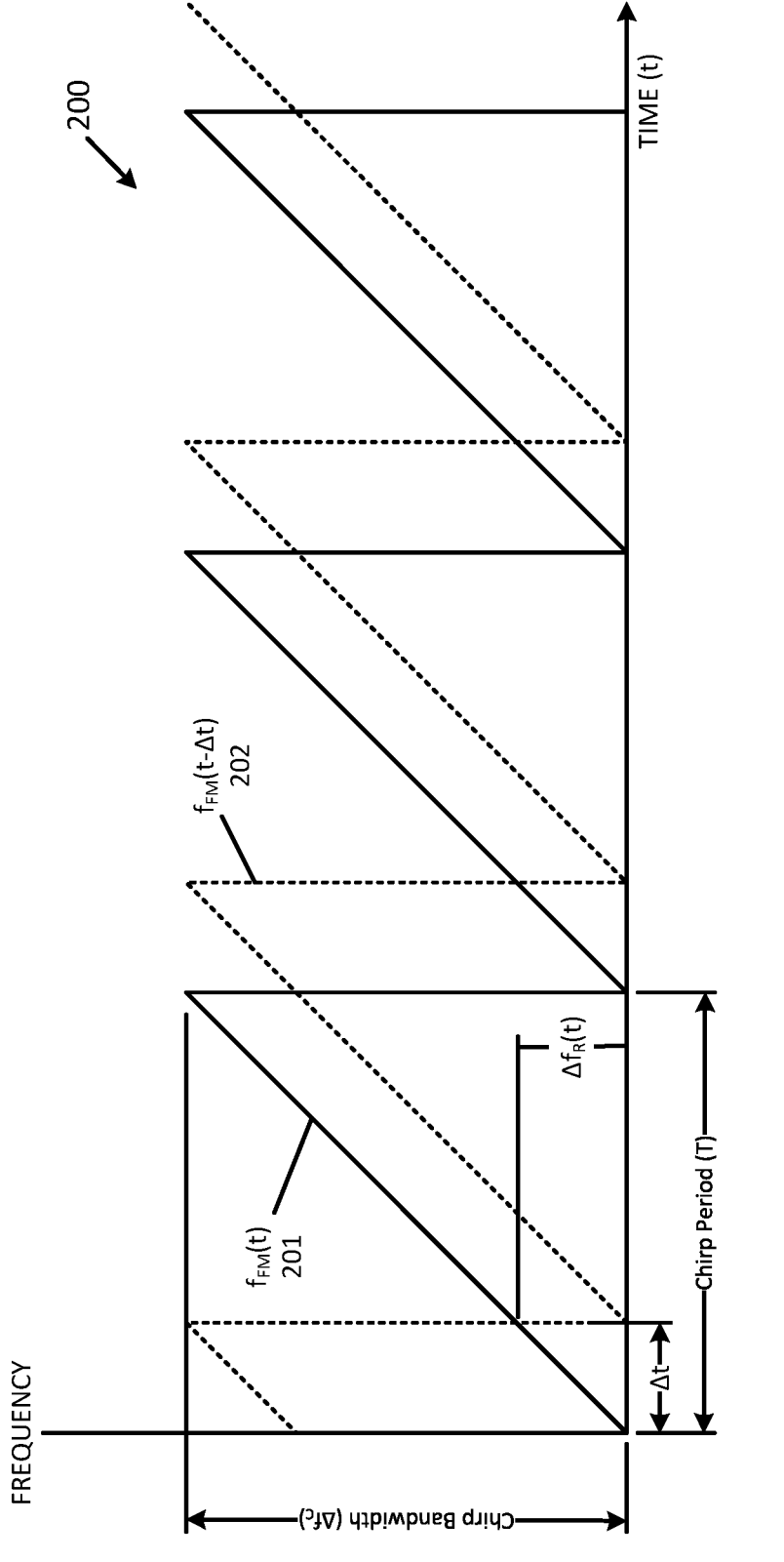
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range-dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3A:
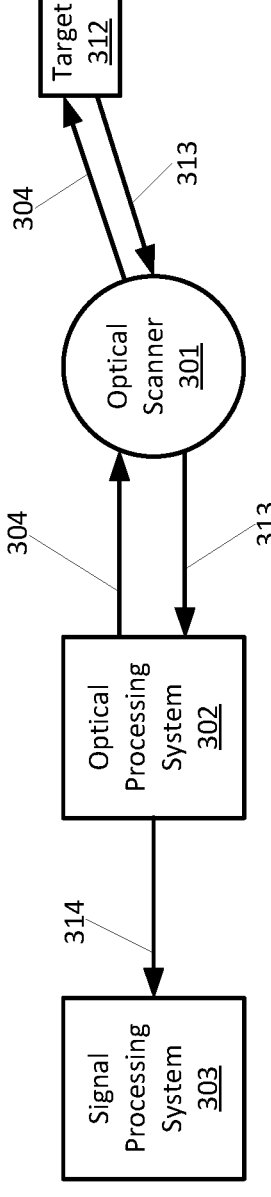
FIG. 3A is a block diagram illustrating an example LIDAR system according to the present disclosure.

FIG. 3A is a block diagram illustrating an example LIDAR system 300 (e.g., an FMCW LIDAR system) according to the present disclosure. Example system 300 includes an optical scanner 301 to transmit an FMCW (frequency-modulated continuous wave) optical beam 304 and to receive a return signal 313 from reflections of the optical beam 304 from targets such as target 312 in the field of view (FOV) of the optical scanner 301. System 300 also includes an optical processing system 302 to generate a baseband electrical signal 314 in the time domain from the return signal 313, where the baseband electrical signal 314 contains frequencies corresponding to LIDAR target ranges. Optical processing system 302 may include elements of free space optics 115, optical circuits 101, optical drivers 103 and optical receivers 104 in LIDAR system 100. System 300 also includes a signal processing system 303 to measure energy of the baseband electrical signal 314 in the frequency domain, to compare the energy to an estimate of LIDAR system noise, and to generate and modify a likelihood metric for selecting a signal peak in the frequency domain that corresponds to a detected target. Signal processing system 303 may include elements of signal conversion unit 106, signal conditioning unit 107, LIDAR control systems 110 and signal processing unit 112 in LIDAR system 100.

Figure 3B:
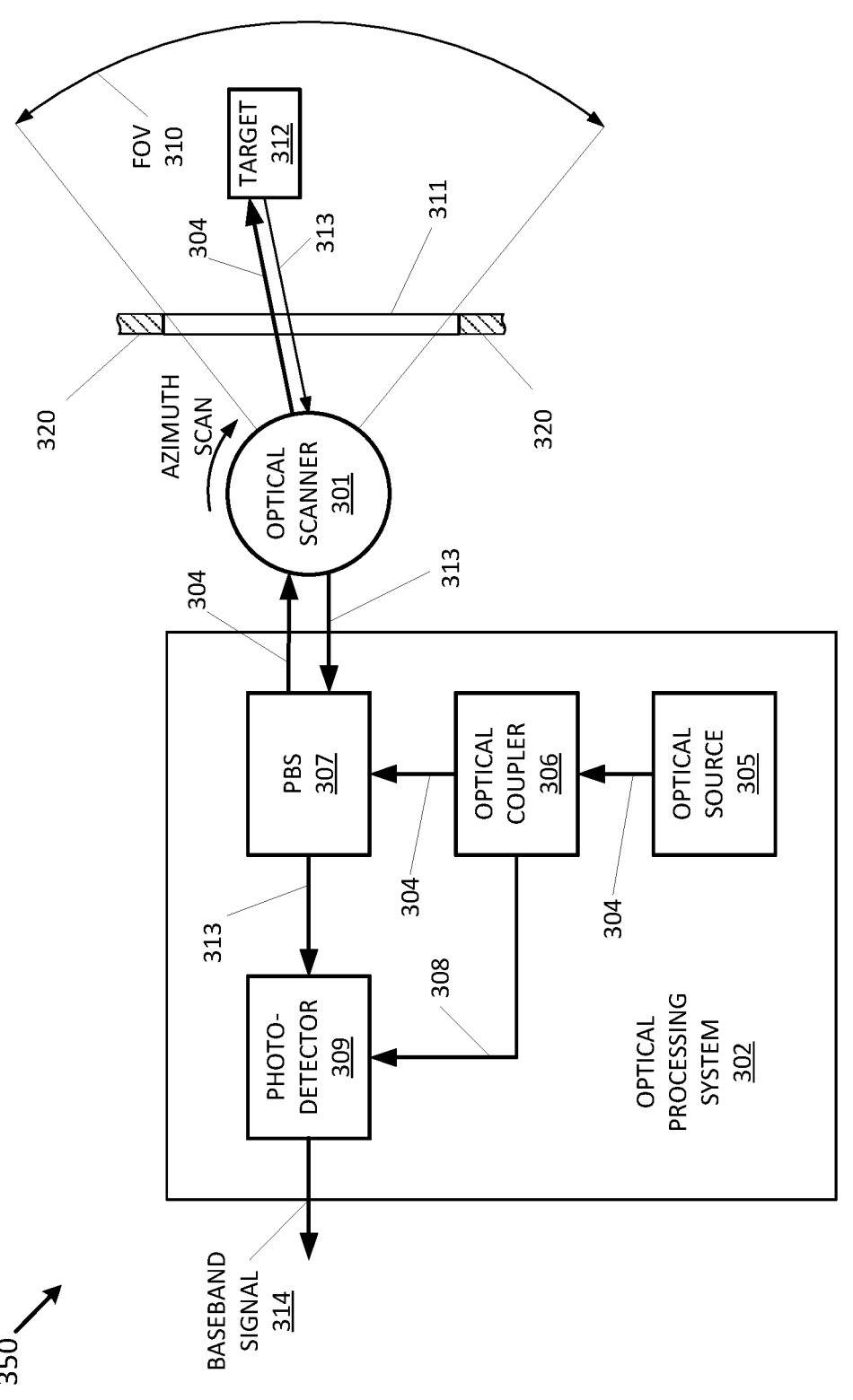
FIG. 3B is a block diagram illustrating an electro-optical optical system according to the present disclosure.

FIG. 3B is a block diagram illustrating an example electro-optical system 350. According to some embodiments, electro-optical system 350 includes the optical scanner 301, similar to the optical scanner 102 illustrated and described in relation to FIG. 1. Electro-optical system 350 also includes the optical processing system 302, which as noted above, may include elements of free space optics 115, optical circuits 101, optical drivers 103, and optical receivers 104 in LIDAR system 100.

Electro-optical processing system 302 includes an optical source 305 to generate the frequency-modulated continuous-wave (FMCW) optical beam 304. The optical beam 304 may be directed to an optical coupler 306 that is configured to couple the optical beam 304 to a polarization beam splitter (PBS) 307 and a sample 308 of the optical beam 304 to a photodetector (PD) 309. The PBS 307 is configured to direct the optical beam 304, because of its polarization, toward the optical scanner 301. Optical scanner 301 is configured to scan a target environment with the optical beam 304, through a range of azimuth and elevation angles covering the field of view (FOV) 310 of a LIDAR window 311 in an enclosure 320 of the optical system 350. In FIG. 3B, for ease of illustration, only the azimuth scan is illustrated.

As shown in FIG. 3B, at one azimuth angle (or range of angles), the optical beam 304 passes through the LIDAR window 311 and illuminates a target 312. A return signal 313 from the target 312 passes through LIDAR window 311 and is directed by optical scanner 301 back to the PBS 307.

The return signal 313, which will have a different polarization than the optical beam 304 due to reflection from the target 312, is directed by the PBS 307 to the photodetector (PD) 309. In PD 309, the return signal 313 is optically mixed with the local sample 308 of the optical beam 304 to generate a baseband electrical signal 314 (e.g., beat signal) with a frequency that is proportional to the range of the scanned target. The baseband electrical signal 314 may be generated by the frequency difference between the local sample 308 of the optical beam 304 and the return signal 313 versus time (i.e., $\Delta f_R(t)$).

Figure 4:
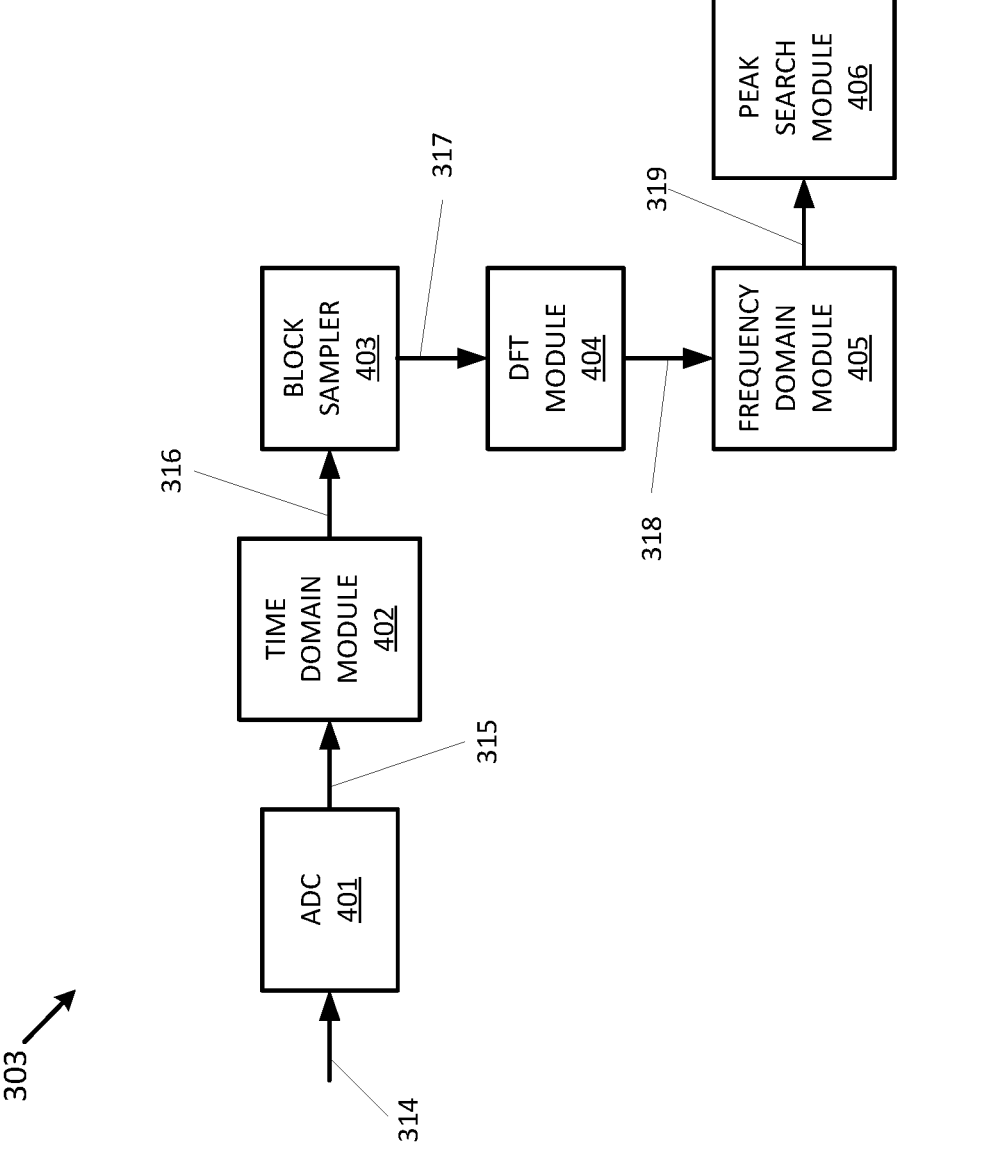
FIG. 4 is a block diagram of an example signal processing system according to the present disclosure.

FIG. 4 is a detailed block diagram illustrating an example of the signal processing system 303 of FIG. 3A, which processes the baseband electrical signal 314, according to some embodiments. As noted above, signal processing unit 303 may include elements of signal conversion unit 106, signal conditioning unit 107, LIDAR control systems 110 and signal processing unit 112 in LIDAR system 100.

According to some embodiments, signal processing system 303 includes an analog-to-digital converter (ADC) 401, a time domain signal processor 402, a block sampler 403, a discrete Fourier transform processor 404, a frequency domain signal processor 405, and a peak search processor 406. The component blocks of signal processing system 303 may be implemented in hardware, firmware, software, or some combination of hardware, firmware and software.

In FIG. 4, the baseband electrical signal 314, which is a continuous analog signal in the time domain, is sampled by ADC 401 to generate a series of time domain samples 315. The time domain samples 315 are processed by the time domain module 402, which conditions the time domain samples 315 for further processing. For example, time domain module 402 may apply weighting or filtering to remove unwanted signal artifacts or to render the signal more tractable for subsequent processing. The output 316 of time domain module 402 is provided to block sampler 403. Block sampler 403 groups the time domain samples 316 into groups of N samples 317 (where N is an integer greater than 1), which are provided to DFT module 404. DFT module 404 transforms the groups of N time domain samples 317 into N frequency bins or subbands (e.g., subband signal spectrum 318) in the frequency domain, covering the bandwidth of the baseband electrical signal 314. The N subband signal spectrum 318 is provided to frequency domain module 405, which conditions the subbands for further processing. For example, frequency domain module 405 may resample and/or average the subband signal spectrum 318 for noise reduction. Frequency domain module 405 may also calculate signal statistics and system noise statistics. The processed subband signal spectrum 319 is then provided to a peak search module 406 that searches for signal peaks representing detected targets in the FOV of the LIDAR system 300.

In some embodiments, the subband signal spectrum 319 provided to the peak search module 406 is the sum of the energy in the target return 313 and all of the noise contributed by the LIDAR system 300 as the target return signal is processed. In some scenarios, electronic systems have sources of noise that limit the performance of those systems by creating a noise floor, which is the combined level of all sources of noise in the system. In order to be detected, a signal in an electronic system such as the subband signal spectrum 319, developed from the baseband electrical signal 314, must be above the noise floor absent specialized signal processing techniques such as signal integration and noise averaging.

Sources of noise in a LIDAR system, such as LIDAR system 300, may include thermal noise, 1/f noise, shot noise, impulse noise, RIN (relative intensity noise associated with lasers), TIA (trans-impedance amplifier) noise, and ADC (analog-to-digital conversion) noise. System noise may be characterized, for example, by its energy versus frequency profile across frequency bins, by its first moments (mean) across the frequency bins, by its second moments (variance) across the frequency bins, by its third moment (asymmetry) across the frequency bins, and/or by its fourth moment (kurtosis, or the sharpness of peaks) across the frequency bins of the frequency spectrum.

Figure 5A:
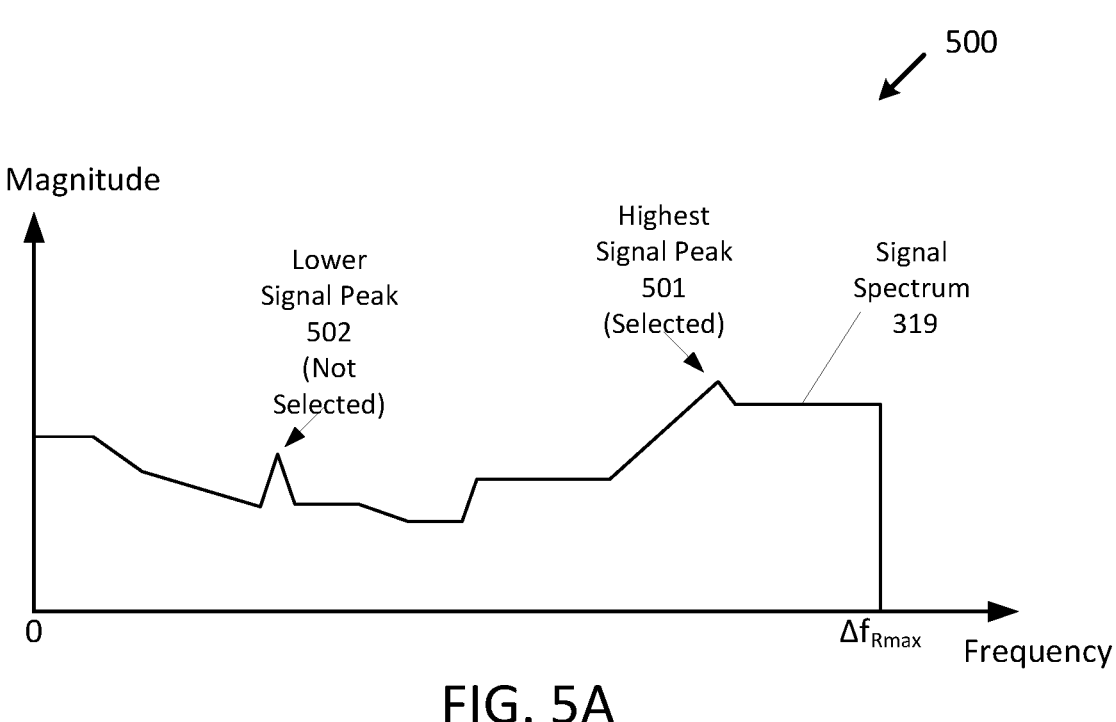
FIG. 5A is a signal magnitude-frequency diagram illustrating an example method of peak detection according to the present disclosure.

FIG. 5A is a diagram 500 illustrating magnitude versus frequency of the subband signal spectrum 319 that includes system noise, shown as a continuous waveform (rather than as discrete frequency bins or subbands) for ease of illustration. Diagram 500 may be generated and/or used by signal processing system 303 of FIG. 3 and peak search module 406 of FIG. 4 to detect a signal peak corresponding to a target detection. Additionally, diagram 500 may be generated and/or used by one or more of the elements of LIDAR system 100 of FIG. 1 (e.g., signal conversion unit 106, signal conditioning unit 107, LIDAR control systems 110 and signal processing unit 112). The frequencies span the range from 0 to $\Delta f_{Rmax}$. In some scenarios, without more information about the subband signal spectrum 319, the peak search module 406 would select the highest signal peak 501 as the return signal that most likely indicates the presence of a target, and not select a lower signal peak 502, for example. However, using a calculated estimate of system noise, the peak search module 406 can be configured to compare the subband signal spectrum 319 to the system noise estimate and could make a more informed selection based on additional selection criteria (e.g., a likelihood metric).

Figure 5B:
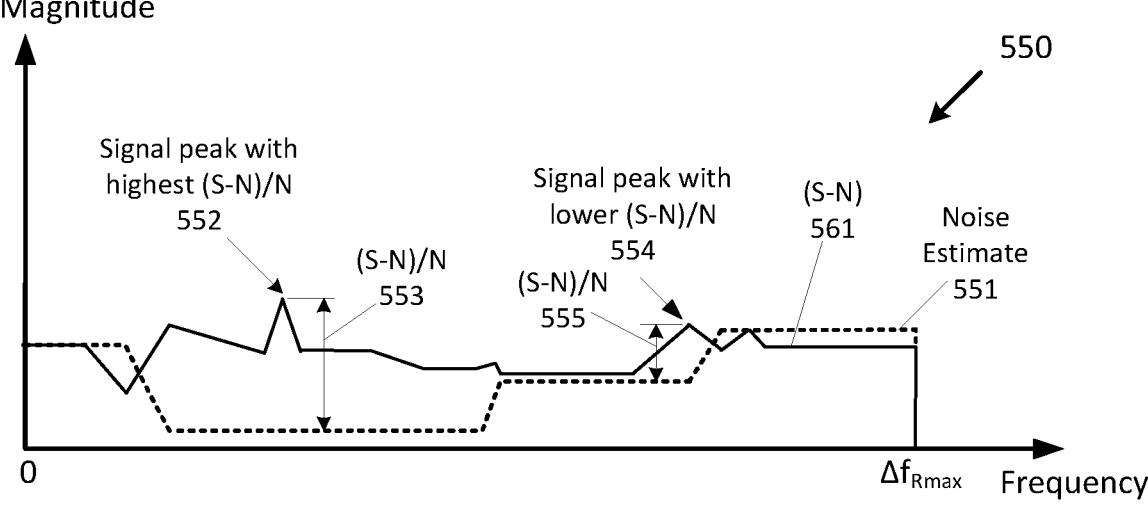
FIG. 5B is a signal magnitude-frequency diagram illustrating a noise estimate compared to a difference between a signal spectrum and the noise estimate according to the present disclosure.

In FIGS. 5A and 5B, signal and noise values are depicted as energy (e.g., intensity) versus frequency contours. However, as previously noted with respect to FIG. 4, the system noise may be additionally characterized by any of its first through fourth moments representing mean energy, energy variance, energy asymmetry and kurtosis versus frequency, respectively. In addition to energy alone, the signal may be characterized in terms of autocorrelation statistics across the frequency bins in the baseband and/or cross-correlation statistics between the signal and the system noise estimate across the frequency bins.

In one example, an estimate of system noise can be obtained by operating a LIDAR system, such as LIDAR system 300, in an anechoic (no-echo) calibration mode where there is no detectable return signal (e.g., return signal 313). This mode of operation generates all of the normal system noise mechanisms and results in a subband signal spectrum that includes energy only from the system noise sources. Accordingly, one or more likelihood metrics for a subband signal spectrum 319 can be generated based on the system noise and any other parameters of the LIDAR system or signal spectrum 319.

FIG. 5B is an energy versus frequency diagram 550 comparing a noise estimate 551 (e.g., the noise estimate as determined in the anechoic (no-echo) calibration mode described above) to the difference between the subband signal spectrum 319 and the noise estimate 551, diagrammed in FIG. 5B as signal minus noise (S–N) 561. In some embodiments, the signal processing system 303 may be configured to use the subband signal (e.g., subband signal spectrum 319) and the system noise estimate (e.g., system noise estimate 651) to generate one or more likelihood metrics (e.g., (S–N)/N, SNR, etc.) used to determine the likelihood that a signal peak in the frequency domain indicates a detected target and to decrease the likelihood that a signal peak in the frequency domain from a false target will be interpreted as a real target. Such likelihood metrics may be used for both detection thresholding and peak selection. Additionally, the likelihood metrics may be further modified (e.g., via weighting, band filtering, etc.) to further increase the probability of proper peak detection.

In the example of FIG. 5B, the peak search module 406 may be configured to select the signal peak with respect to one of the determined likelihood metrics. For example, the likelihood metric may be a signal minus noise to noise ratio ("(S–N/N"). The peak search module 406 may thus select the highest non-negative signal minus noise to noise ratio (S–N)/N. Under this selection criteria, signal peak 552 with (S–N)/N 553 would be selected over signal peak 554 with (S–N)/N 555 because (S–N)/N 553 is larger than (S–N)/N 555. In another example, the peak search module 406 may use the likelihood metric of signal minus noise ("S–N") for peak selection in which case peak 552 would still be selected over peak 554. Any other likelihood metric may also be used to select a peak, such as SNR, raw intensity (e.g., signal 319), or other metric generated based on the LIDAR system and the subband signal spectrum 319.

Figure 6A:
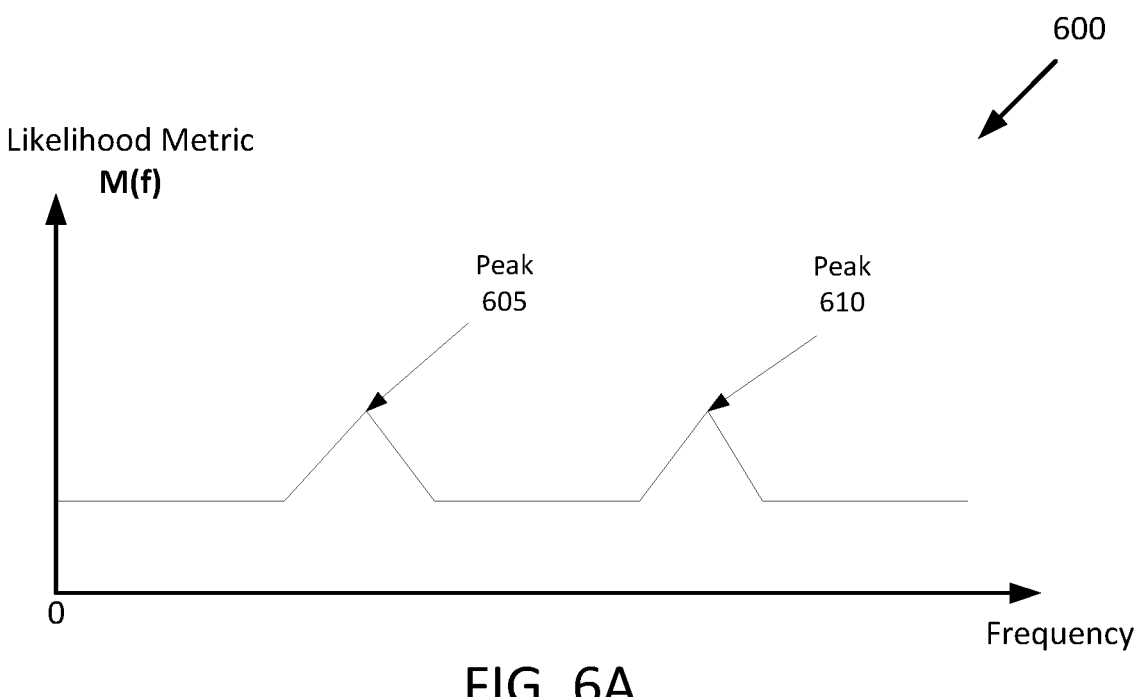
FIG. 6A is a likelihood metric-frequency diagram illustrating an example of a likelihood metric for peak detection, according to the present disclosure.
Figure 6B:
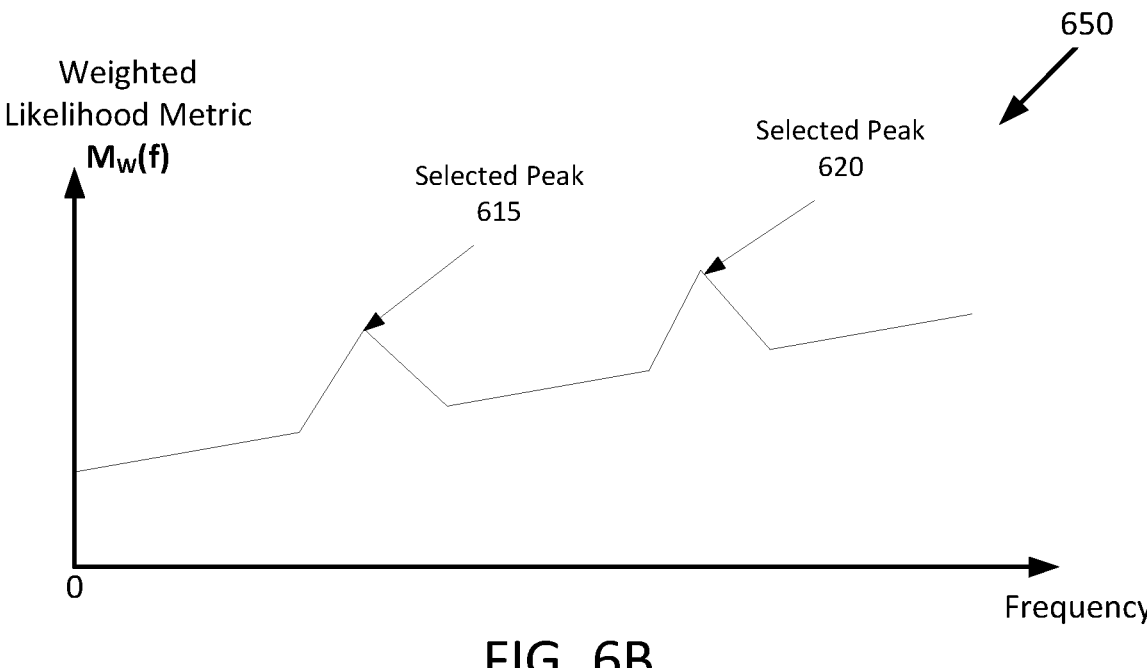
FIG. 6B is a likelihood metric-frequency diagram illustrating another example of peak detection using a weighted likelihood metric for thresholding and peak selection, according to the present disclosure.

FIGS. 6A and 6B depict likelihood metric-frequency diagrams 600 and 650 illustrating examples of peak detection using a weighted likelihood metric for peak selection. Diagrams 600 and 650 may be generated and/or used by signal processing system 303 of FIG. 3 or peak search module 406 of FIG. 4. Additionally, diagrams 600 and 650 may be generated and/or used by one or more of the elements of LIDAR system 100 of FIG. 1 (e.g., signal conversion unit 106, signal conditioning unit 107, LIDAR control systems 110 and signal processing unit 112).

As discussed above, the signal processing system 303 of FIGS. 3A and 4 may generate a waveform in a frequency domain in which each frequency of a spectrum of frequencies has an associated energy value (e.g., intensity). The signal processing system 303 (e.g., via peak search module 406) may generate one or more likelihood metrics for each frequency in the diagram based on the energy values. A likelihood metric may be a metric generated for each of the frequencies to increase the likelihood of peak detection while reducing the likelihood of false alarm detection (e.g., due to noise). For example, the likelihood metric may be a signal-to-noise ratio (SNR), intensity, signal-minus-noise, signal-minus-noise ratio, etc., as described above with respect to FIGS. 5A-B. Whatever likelihood metric is selected, in some embodiments a peak search module (e.g., peak search module 406) may select the frequency, or frequency bin, with the maximum peak with respect to the likelihood metric.

As depicted in FIG. 6A, a likelihood metric M(f) may be generated in a frequency domain for a set of frequencies corresponding to a distance resolution of the LIDAR system. The likelihood metric may result in one or more peaks (e.g., peaks 605 and 610) that may correspond to a target detection or potential noise. For example, peak 610 may correspond to a target detection while peak 605 may be a noise event. However, because the two peaks 605 and 610 are substantially the same magnitude with respect to the likelihood metric M(f) either of the peaks may be selected for use in target detection and ranging. Therefore, in such an instance the likelihood metric M(f) may be unreliable for peak selection. Thus, the likelihood metric M(f) may be modified based on known properties of the LIDAR system of target to increase the likelihood of proper target detection.

Referring to FIG. 6B, the likelihood metric M(f) of diagram 600 may be weighted to generate a weighted likelihood matric $M_W(f)$ to bias the peak selection toward higher frequencies (e.g., peak 610 over peak 605). For example, previous detections or know attributes of the LIDAR system may indicate that peaks at higher frequencies are more likely to correspond to actual target detections while peaks at lower frequencies are more likely to be a noise event or other interferer. Thus, the weighted likelihood metric $M_W(f)$ may be weighted in a manner that that biases peak selection toward higher frequencies despite similar peaks for the original likelihood metric M(f) of diagram 600. In an another example, if lower frequencies are more likely to be actual target detections while higher frequencies are more likely noise events, the weighted likelihood metric $M_W(f)$ may bias selection toward lower frequencies, in effect reversing diagram 650.

Although depicted in diagram 650 of FIG. 6B as linearly weighted (e.g., $M_W(f)=M(f)+\Delta f$) based on frequency, the likelihood metric M(f) may be weighted in any other manner to bias detections based on a-priori information. For example, the likelihood metric M(f) may be weighted in a multiplicative manner (e.g., $M_W(f)=M(f)*W(f)$, where W(f) is a weighting for the frequency f) or using any other general weighting function (e.g., $M_W(f)=W(f, M(f))$, where W(f, M(f)) is a weighting function with parameters of frequency f and likelihood metric M(f)). Additionally, the weighting function may depend on any variables of the frequency domain diagram such as peak width or based on whether the scene is dynamic or stationary.

The general weighting function may also be extended to use additional parameters, such as higher order information such as known interferers, previous target detections, or estimated target locations, to weight the likelihood metric. For example, the weighting function may multiply the likelihood metric by zero for frequencies corresponding to known noise events or interferers. Similarly, the weighting function may increase the weighting of the likelihood metric for estimated target locations which may be based in part on previous target detections to increase detection likelihood for such frequencies.

FIG. 7 flowchart illustrating a method 700 of peak detection using a weighted likelihood metric for peak selection in a LIDAR system, such as LIDAR system 100 or LIDAR system 300. Method 700 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 700 begins at operation 710, where processing logic (e.g., peak search module 406) determines a likelihood metric for a spectrum of frequencies in a frequency domain waveform. The likelihood metric may be an intensity, an SNR, a signal minus noise to noise ratio ((S−N)/N), or any other likelihood metric used to increase target detections and reduce false alarm detections. The likelihood metric may be determined based on the initial frequency domain waveform and noise estimates as depicted in FIGS. 5A and 5B.

At operation 720, the processing logic (e.g., peak search module 406) applies a weight to the likelihood metric for each frequency in the spectrum of frequencies of the frequency domain waveform. The weighting of the likelihood metric may bias or favor certain detections that are known to have a higher probability of being a proper target detection. For example, the LIDAR system may consistently have noise events in lower frequencies while target detections are generally in the higher frequency range. Thus, the processing logic may bias peak selection toward the higher frequencies by weighting higher frequencies more heavily than lower frequencies. In another example, where previous detections or other information indicate frequencies where a target detection is likely, the processing logic may weight a frequency band corresponding to the previously detected target more heavily. Weights may be applied according to any other scenario to bias detections based on known information about the LIDAR system or expected targets.

In some embodiments, the weight may be a simple offset adding a frequency dependent offset to the likelihood metric for each frequency. In another example, the weight may be a multiplicative weight in which the likelihood metric value for each frequency is multiplied by a frequency dependent weight. In another example, a general weighting function may be applied to the frequency spectrum where the general weighting function takes a particular frequency and the likelihood metric for that frequency as inputs and generates a weighted likelihood metric for the frequency. In some embodiments, the applied weight may be dependent on variables other than frequency, such as peak width or a correlation metric, etc. In some embodiments, the processing logic may determine whether the scene viewed by the LIDAR system is stationary or dynamic and apply a weight function accordingly. For example, if the scene is dynamic, such as if the LIDAR system is in motion, then the processing logic may weight frequencies corresponding to closer targets more heavily to favor detection of targets that are imminently in contact with the LIDAR system (e.g., such as obstacles of an automated driving vehicle). Additionally, based on known information about a scene or the LIDAR system, certain frequencies may be known to correspond to interferers or other noise around which the processing logic may reduce the weight, or multiply the metric by zero, for such frequencies to avoid detections of the interferer. Similarly, based on higher order information such as previous detections, known target locations, etc. the processing logic may determine the weighting function to be higher for those frequencies to bias detection toward such frequencies.

At operation 730, the processing logic (e.g., peak search module 406) selects a peak frequency from the frequency domain waveform corresponding to the frequency with the highest value for the weighted likelihood metric. In some embodiments, the weighted likelihood metric may result in a highest peak that is different from the highest peak in the frequency domain waveform using the original likelihood metric.

Figure 8:
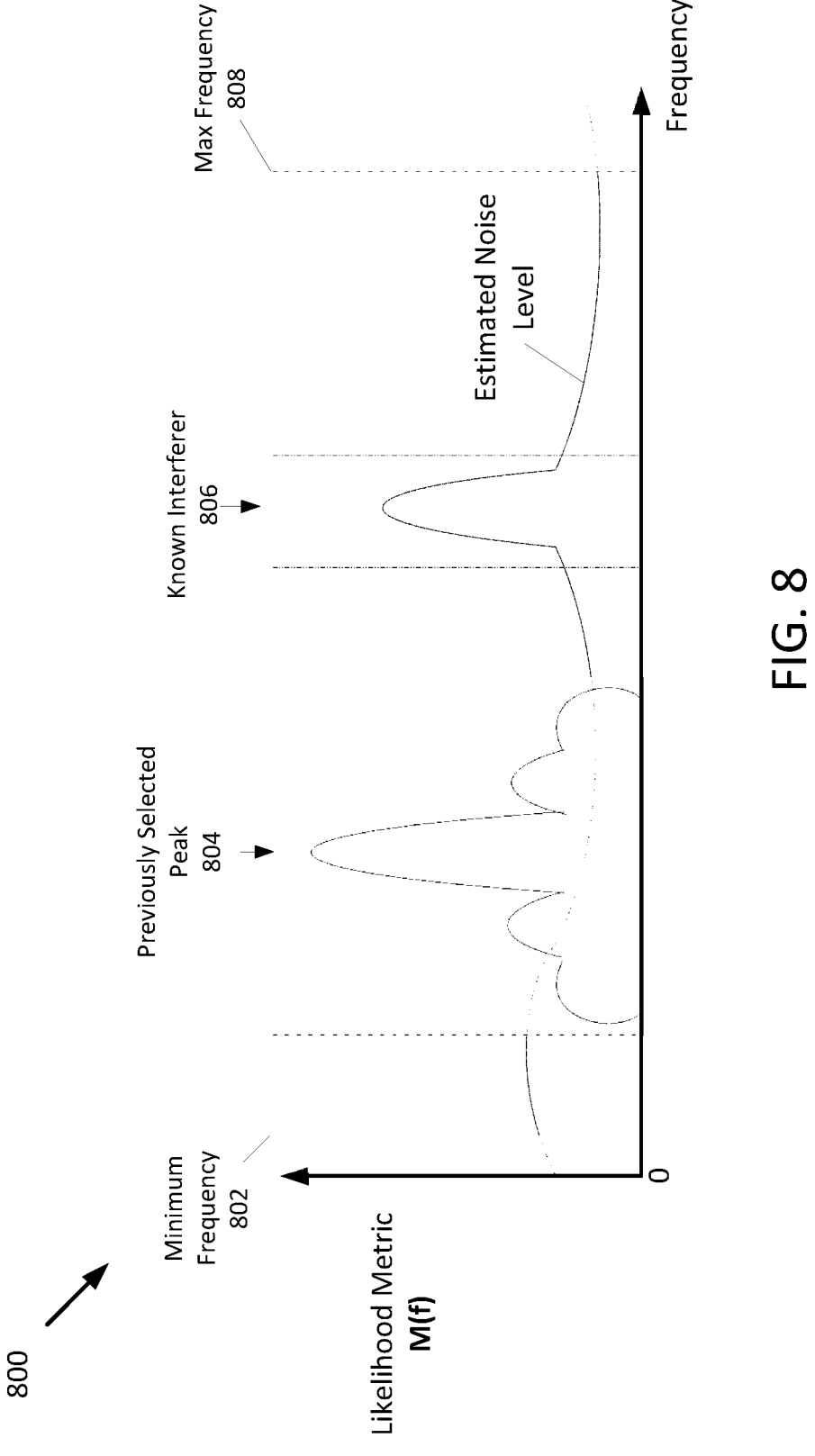
FIG. 8 is a likelihood metric-frequency diagram illustrating an example of filtering out frequencies prior to peak selection, according to the present disclosure.

FIG. 8 depicts a likelihood metric-frequency diagram 800 illustrating an example method of peak detection with filtering of frequency bands prior to peak selection. Diagram 800 may be generated and/or used by signal processing system 303 of FIG. 3 or peak search module of FIGS. 4 and 5. Additionally, diagram 800 may be generated and/or used by one or more of the elements of LIDAR system 100 of FIG. 1 (e.g., signal conversion unit 106, signal conditioning unit 107, LIDAR control systems 110 and signal processing unit 112).

In some embodiments, a peak search module (e.g., peak search module 406 of FIG. 4) may first perform a thresholding operation on the frequencies in the waveform to filter out any frequencies that are below a threshold value for a thresholding metric (e.g., a likelihood metric for thresholding). The thresholding metric may be intensity, SNR, or any other likelihood metric. The peak search module may then perform peak selection based on a peak selection metric (e.g., a likelihood metric for peak selection) on the remaining frequencies that were not filtered out by the thresholding operation. The frequency of the remaining frequencies that has the highest value for the peak selection metric may be selected for target detection.

As depicted in diagram 800 of FIG. 8, several frequency bands may be filtered out from further thresholding and peak selection. For example, a minimum frequency 802 may be defined and the frequencies below the minimum frequency may be removed (e.g., filtered out) from peak selection. The minimum frequency may be defined to filter out detections due to particles accumulated on the sensor window or low frequency noise from optical or electrical sources. In another example, a band around a previously selected peak (e.g., previously selected peak 804) may be filtered out so that the side lobes of the peak are not selected as an additional detection. In another example, a band around a known interferer (e.g., known interferer 806) that may be known based on an estimated noise level may be filtered out from peak selection. The known interferer may have an intensity that is unknown or time-varying and therefore may need to be filtered out prior to peak selection. The center frequency (e.g., peak) of the known interferer may vary over time and thus the filtered frequency band may dynamically move with the interferer. In yet another example, a maximum frequency (e.g., max frequency 808) may be defined and the frequencies above the maximum frequency may be filtered out for peak selection. Accordingly, only peaks in the frequency ranges that are not filtered out may be selected for target detection. As depicted, in diagram 800 of FIG. 8, no peak would be selected because the previously selected peak 804 and the known interferer 806 would be filtered out, thus avoiding a false alarm detection or redundant detection.

FIG. 9 flowchart illustrating a method 900 of peak detection using different likelihood metrics for thresholding and peak selection in a LIDAR system, such as LIDAR system 100 or LIDAR system 300. Method 700 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 900 begins at operation 910, where processing logic (e.g., peak search module 406) determines a likelihood metric for the spectrum of frequencies of the frequency domain waveform. The likelihood metric may be an intensity, an SNR, a signal minus noise to noise ratio ((S−N)/N), or any other likelihood ratio used to increase target detections and reduce false alarm detections.

At operation 920, the processing logic (e.g., peak search module 406) filters out a band of frequencies in the spectrum of frequencies based on previously collected information associated with the target or the LIDAR system. The processing logic may filter out one or more frequency bands. The frequency bands filtered out may be statically selected (e.g., the selected frequencies filtered remain the same over time) or they may be dynamically determined over time where each successive peak selection may operate on a different set of frequencies. The previously collected information associated with the target may include known properties of the target such as target reflectivity, target position (e.g., based on previous detections of the target), whether the target is a moving target, or any other target properties. The previously collected information for the LIDAR system may include noise properties of the LIDAR system (e.g., estimated noise levels), known interferers of the LIDAR system, or any other properties of the LIDAR system that may have an effect on detected signals.

For example, the processing logic may determine a minimum frequency below which frequencies are filtered out to prevent detections from particulars accumulated on the sensor window or form low-frequency noise from optical or electrical sources. In another example, a band of frequencies around a known interferer whose intensity is unknown or time-varying may be filtered out to avoid selecting the interferer as a target detection. In another example, the processing logic may filter out a band of frequencies around a previously selected peak to avoid selecting side lobes of that peak as a separate peak.

At operation 930, the processing logic (e.g., peak search module 406) selects a peak frequency from remaining frequencies of the spectrum of frequencies that were not filtered out. The peak frequency may correspond to a frequency with the highest value for the likelihood metric.

FIG. 10 flowchart illustrating a method 1000 of peak detection using different likelihood metrics for thresholding and peak selection in a LIDAR system, such as LIDAR system 100 or LIDAR system 300. Method 1000 may be performed by one or more of the elements of LIDAR system 100 of FIG. 1 (e.g., signal conversion unit 106, signal conditioning unit 107, LIDAR control systems 110 and signal processing unit 112) and/or peak search module 406 of FIG. 4.

Method 1000 begins at operation 1010, where processing logic (e.g., peak search module 406) generates a frequency domain waveform based on a baseband signal in a time domain, wherein the frequency domain waveform includes a spectrum of frequencies. At operation 1020, processing logic (e.g., peak search module 406) determines a likelihood metric for the spectrum of frequencies of the frequency domain waveform. The likelihood metric may be an intensity, a signal to noise ratios (SNR), a signal minus noise to noise ratio ((S–N)/N), or any other likelihood ratio used to increase target detections and reduce false alarm detections.

At operation 1030, in response to one or parameters associated with the frequency domain waveform satisfying a condition, processing logic (e.g., peak search module 406) modifies the likelihood metric for the spectrum of frequencies based on one or more parameters associated with the frequency domain waveform to generate a modified likelihood metric for the spectrum of frequencies. In one embodiment, the processing logic may apply a weight to the likelihood metric for each of the frequencies in the spectrum of frequencies to generate a weighted likelihood metric for the spectrum of frequencies of the frequency domain waveform. The processing logic may determine the weight applied to the likelihood metric based on at least one of frequency, peak width, or a correlation metric. In another example, the processing logic may determine the weight applied to the likelihood metric based on whether a scene scanned by the LIDAR system is static or dynamic.

In some embodiments, the processing logic may filter out a portion of the frequencies in the spectrum of frequencies based on previously collected information associated with the target or the LIDAR system. The portion of the frequencies may include one or more bands of frequencies. In one example, the band of frequencies filtered out may correspond to an interferer to be filtered out from the frequency domain waveform prior to peak selection. In another example, the band of frequencies filtered out may correspond to a previously selected peak.

At operation 1040, processing logic (e.g., peak search module 406) selects a peak frequency from the spectrum of frequencies with the highest value for the modified likelihood metric. In one embodiment, the processing logic may select the peak frequency based on the weighted likelihood metric. At operation 1050, the processing logic (e.g., signal processing unit 112) determines one or more properties of a target based at least in part on the selected peak frequency. For example, the processing logic may use the selected peak frequency to determine a range and velocity of the target.

FIG. 11 is a block diagram of a processing system 1100 (e.g., similar to signal processing system 303 illustrated and described above with respect to FIG. 4) in a LIDAR system such as LIDAR system 100 or LIDAR system 300. Processing system 1100 includes a processing device 1101, which may be any type of general purpose processing device or special purpose processing device designed for use in the LIDAR system. Processing device 1101 is coupled with a memory 1102, which can be any type of non-transitory computer-readable medium (e.g., RAM, ROM, PROM, EPROM, EEPROM, flash memory, magnetic disk memory or optical disk memory) containing instructions that, when executed by processing device 901 in the LIDAR system, cause the LIDAR system to perform the method described herein. In particular, memory 1102 includes instructions 1104 to generate a frequency domain waveform based on a baseband electrical signal in a time domain, wherein the frequency domain waveform includes a spectrum of frequencies (e.g., signal spectrum 319); instructions 1106 to determine a likelihood metric for the spectrum of frequencies of the frequency domain waveform; instructions 1108 to in response to one or more parameters associated with the frequency domain waveform satisfying a condition, modify the likelihood metric for the spectrum of frequencies based on the one or more parameters to generate a modified likelihood metric for the spectrum of frequencies; instructions 1110 to select a peak frequency from the spectrum of frequencies, the peak frequency corresponding to a frequency with the highest value for the modified likelihood metric; and instructions 1112 to determine one or more properties of a target based at least in part on the selected peak frequency.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:

an optical scanner to transmit an optical beam towards, and receive a return signal from, a target;

an optical processing system coupled to the optical scanner to generate a baseband electrical signal in a time domain from the return signal, the baseband electrical signal comprising frequencies corresponding to LIDAR target ranges; and a signal processing system coupled to the optical processing system, comprising:

a processor; and a memory operatively coupled to the processor, the memory to store instructions that, when executed by the processor, cause the LIDAR system to:

generate a frequency domain waveform based on the baseband electrical signal in the time domain, wherein the frequency domain waveform comprises a spectrum of frequencies;

determine a likelihood metric for the spectrum of frequencies of the frequency domain waveform;

in response to one or more parameters associated with the frequency domain waveform satisfying a condition, modify the likelihood metric for the spectrum of frequencies based on the one or more parameters to generate a modified likelihood metric for the spectrum of frequencies, wherein to modify the likelihood metric, the instructions, when executed by the processor, cause the LIDAR system to apply a weight to the likelihood metric for each of the frequencies of the spectrum of frequencies to generate a weighted likelihood metric for the spectrum of frequencies of the frequency domain waveform;

select a peak frequency from the spectrum of frequencies corresponding to a frequency with a highest value for the modified likelihood metric; and determine one or more properties of the target based at least in part on the selected peak frequency.

2. The LIDAR system of claim 1, wherein the instructions, when executed by the processor, further cause the LIDAR system to:

select a first peak frequency from the spectrum of frequencies corresponding to the frequency with the highest value for the weighted likelihood metric.

3. The LIDAR system of claim 1, wherein the instructions, when executed by the processor, further cause the LIDAR system to:

determine the weight applied to the likelihood metric based on at least one of a frequency variable, a peak width, or a correlation metric.

4. The LIDAR system of claim 1, wherein the instructions, when executed by the processor, further cause the LIDAR system to:

determine the weight applied to the likelihood metric based on whether a scene scanned by the LIDAR system is static or dynamic.

5. The LIDAR system of claim 1, wherein to modify the likelihood metric, the instructions, when executed by the processor, further cause the LIDAR system to:

filter out a portion of the frequencies in the spectrum of frequencies based on previously collected information associated with the target or the LIDAR system.

6. The LIDAR system of claim 5, wherein the portion of the frequencies comprises one or more bands of frequencies in the spectrum of frequencies of the frequency domain waveform.

7. The LIDAR system of claim 6, wherein the one or more bands of frequencies corresponds to an interferer to be filtered out from the frequency domain waveform prior to peak selection.

8. The LIDAR system of claim 6, wherein the one or more bands of frequencies corresponds to a previously selected peak.

9. A method, comprising:

generating a frequency domain waveform based on a baseband electrical signal in a time domain, wherein the frequency domain waveform comprises a spectrum of frequencies;

determining a likelihood metric for the spectrum of frequencies of the frequency domain waveform;

in response to one or more parameters associated with the frequency domain waveform satisfying a condition, modifying, by a processing device of a light detection and ranging (LIDAR) system, the likelihood metric for the spectrum of frequencies based on the one or more parameters associated with the frequency domain waveform to generate a modified likelihood metric for the spectrum of frequencies, applying a weight to the likelihood metric for each frequency in the spectrum of frequencies to generate a weighted likelihood metric for the spectrum of frequencies of the frequency domain waveform;

selecting, by the processing device, a peak frequency from the frequency domain waveform corresponding to a frequency with a highest value for the modified likelihood metric; and determining one or more properties of a target based at least in part on the selected peak frequency.

10. The method of claim 9, further comprising:

selecting a first peak frequency from the spectrum of frequencies corresponding to the frequency with the highest value for the weighted likelihood metric.

11. The method of claim 9, further comprising:

determining the weight applied to the likelihood metric based on at least one of a frequency variable, a peak width, or a correlation metric.

12. The method of claim 9, further comprising:

determining the weight applied to the likelihood metric based on whether a scene scanned by the LIDAR system is static or dynamic.

13. The method of claim 9, wherein modifying the likelihood metric further comprises:

filtering out a portion of the spectrum of frequencies based on previously collected information associated with the target or the LIDAR system.

14. The method of claim 13, the portion of the spectrum of frequencies comprises one or more bands of frequencies in the spectrum of frequencies of the frequency domain waveform.

15. The method of claim 14, wherein the one or more bands of frequencies corresponds to an interferer to be filtered out from the frequency domain waveform prior to peak selection.

16. The method of claim 14, wherein the one or more bands of frequencies corresponds to a previously selected peak.

17. A light detection and ranging (LIDAR) system, comprising:

an optical scanner to transmit an optical beam towards a target and receive a return signal from the target;

an optical processing system coupled to the optical scanner to generate a baseband electrical signal in a time domain from the return signal, the baseband electrical signal comprising frequencies corresponding to LIDAR target ranges; and a signal processing system coupled to the optical processing system, comprising:

circuitry; and a memory operatively coupled to the circuitry, the memory to store instructions that, when executed by the circuitry, cause the LIDAR system to:

generate a frequency domain waveform based on the baseband electrical signal in the time domain, wherein the frequency domain waveform comprises an intensity for a spectrum of frequencies;

determine a likelihood metric for each of the frequencies in the spectrum of frequencies based on the frequency domain waveform;

in response to one or more properties of the LIDAR system, the target, or the frequency domain waveform satisfying a condition, generate a modified likelihood metric for each of the frequencies in the spectrum of frequencies based on the one or more properties of the LIDAR system, the target, or the frequency domain waveform, wherein to generate the modified likelihood metric, the instructions, when executed by the circuitry, cause the circuitry to apply a weight function to each of the frequencies in the spectrum of frequencies, wherein the weight function is determined based on the one or more properties of the LIDAR system, the target, or the frequency domain waveform;

select a peak frequency from the spectrum of frequencies corresponding to a frequency with a highest value for the modified likelihood metric; and determine at least a range of the target based at least in part on the selected peak frequency.

18. The LIDAR system of claim 17, wherein to generate the modified likelihood metric, the instructions, when executed by the circuitry, further cause the LIDAR system to:

filter out one or more frequency bands of the spectrum of frequencies based on the one or more properties of the LIDAR system, the target, or the frequency domain waveform.

19. The LIDAR system of claim 18, wherein the one or more frequency bands corresponds to a previously selected peak.

20. The LIDAR system of claim 18, wherein the one or more frequency bands corresponds to an interferer to be filtered out from the frequency domain waveform prior to peak selection.

21. The LIDAR system of claim 17, wherein the instructions, when executed by the circuitry, further cause the LIDAR system to:

select a first peak frequency from the spectrum of frequencies corresponding to the frequency with the highest value for the modified likelihood metric.

* * * * *